United States Patent [19]

Janku

[11] Patent Number: 4,902,881

[45] Date of Patent: Feb. 20, 1990

[54] PARALLEL PROCESS COMMUNICATIONS TERMINAL AND NETWORK

[75] Inventor: Jan A. Janku, Atherton, Calif.

[73] Assignee: Faxplus Corporation, Santa Clara, Calif.

[21] Appl. No.: 205,237

[22] Filed: Jun. 10, 1988

[51] Int. Cl.⁴ .............................................. G06F 7/08
[52] U.S. Cl. .................................. 235/381; 235/379; 235/380
[58] Field of Search ...................... 235/379, 380, 381

[56] References Cited

U.S. PATENT DOCUMENTS

| | | | |
|---|---|---|---|
| Re. 32,115 | 4/1986 | Lockwood et al. | 235/381 |
| 3,752,904 | 8/1973 | Waterbury | 178/5.1 |
| 3,896,266 | 7/1975 | Waterbury | 179/1 |
| 4,247,759 | 1/1981 | Yuris et al. | 235/381 |
| 4,439,636 | 3/1984 | Newkirk et al. | 179/7.1 |

Primary Examiner—Harold I. Pitts
Attorney, Agent, or Firm—Thomas Schneck

[57] ABSTRACT

A communications terminal and network of such terminals offering simultaneous real time or delayed document and voice services through a host processor with overall control, including accounting functions based upon credit card billing. Document services include facsimile, copying, electronic mail and document storage. Voice services include voice mail, and telephone. Real time document handling is achieved using a high speed coprocessor to implement a data compression-decompression algorithm. A pair of common communications channels, such as public telephone subscriber network lines, allow connection of the terminal to a hub. A plurality of interconnected hubs allow wide area availability of document and voice communication services.

22 Claims, 6 Drawing Sheets

Microfiche Appendix Included
(2 Microfiche, 129 Pages)

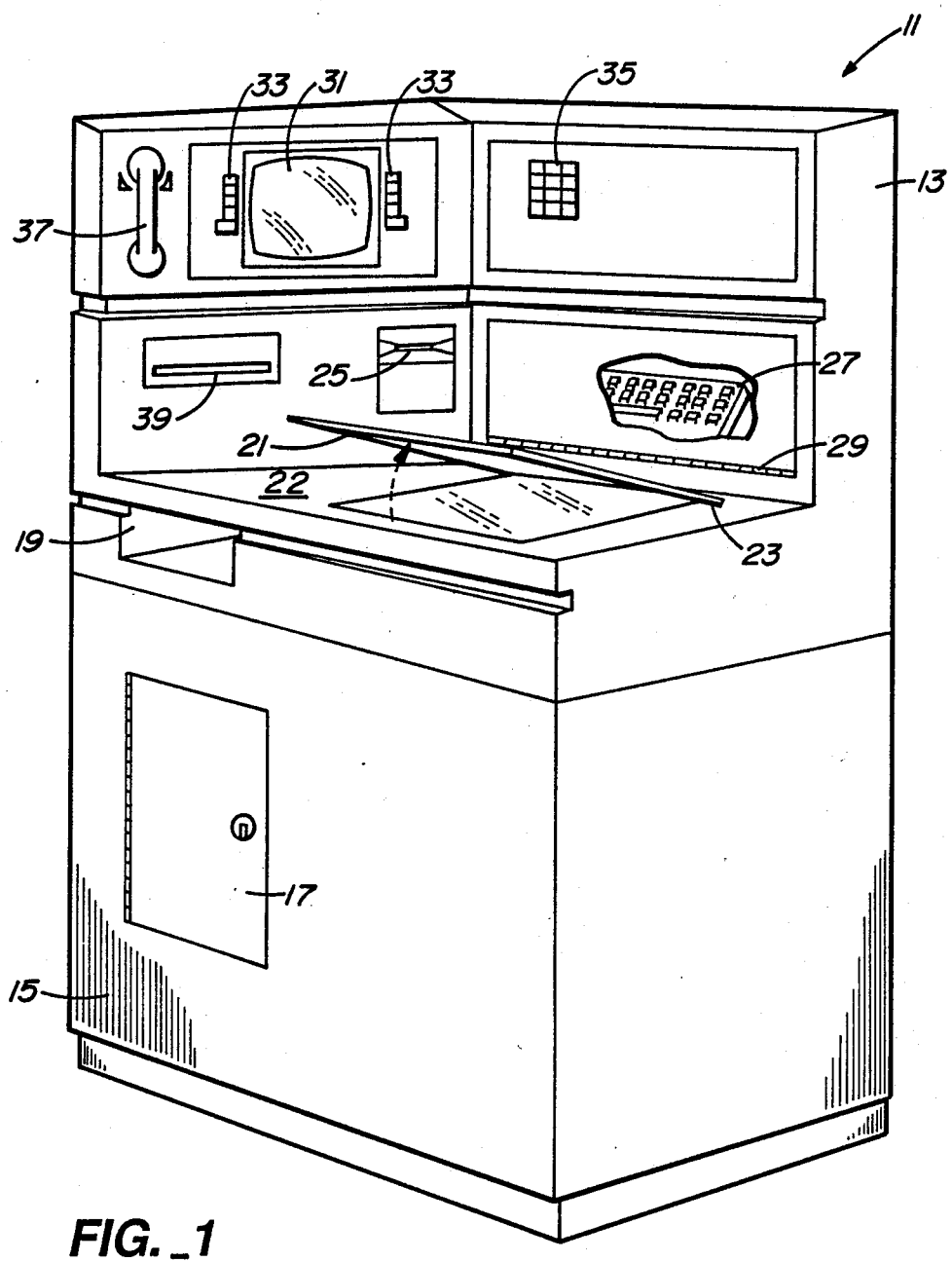
FIG._1

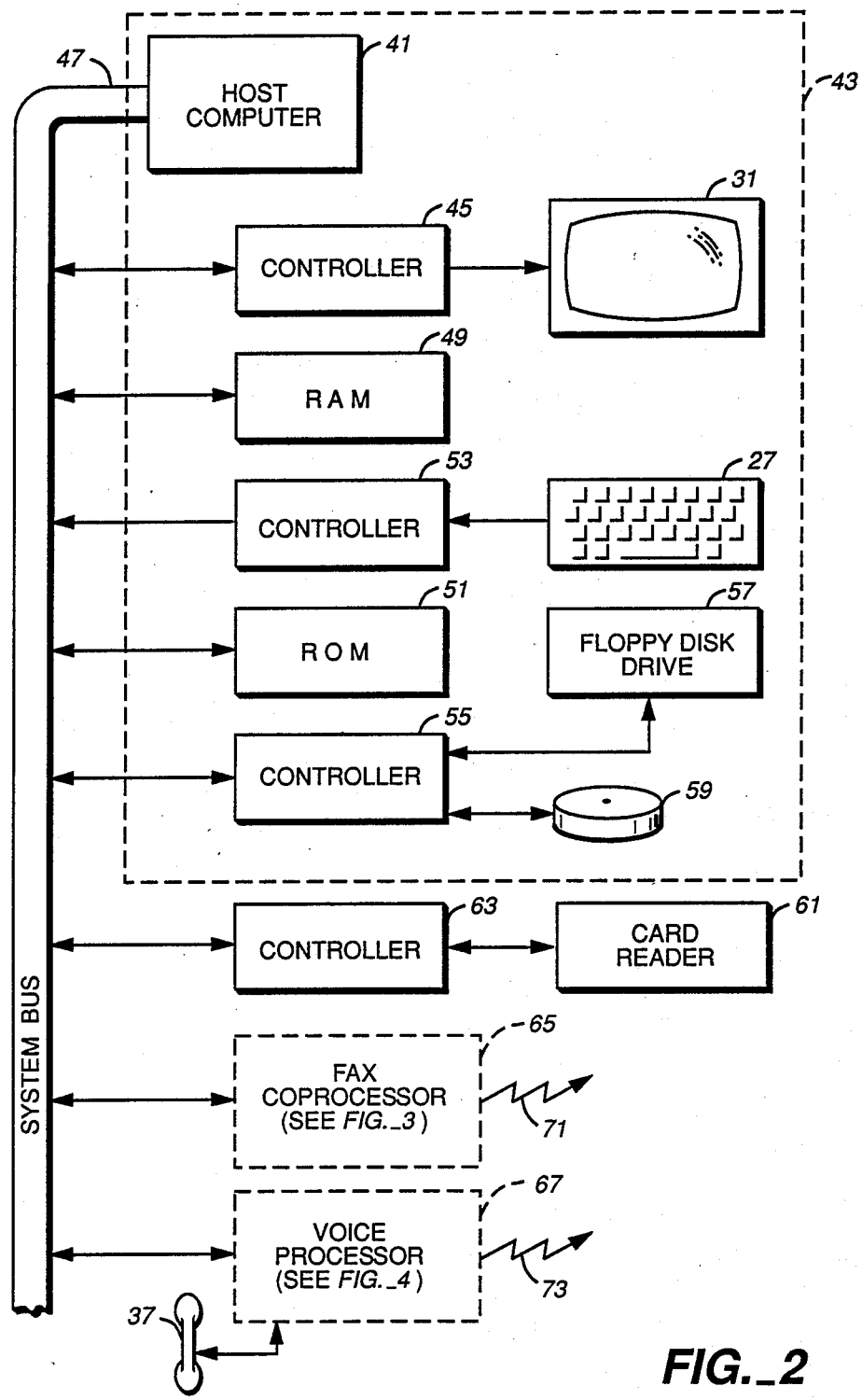
FIG._2

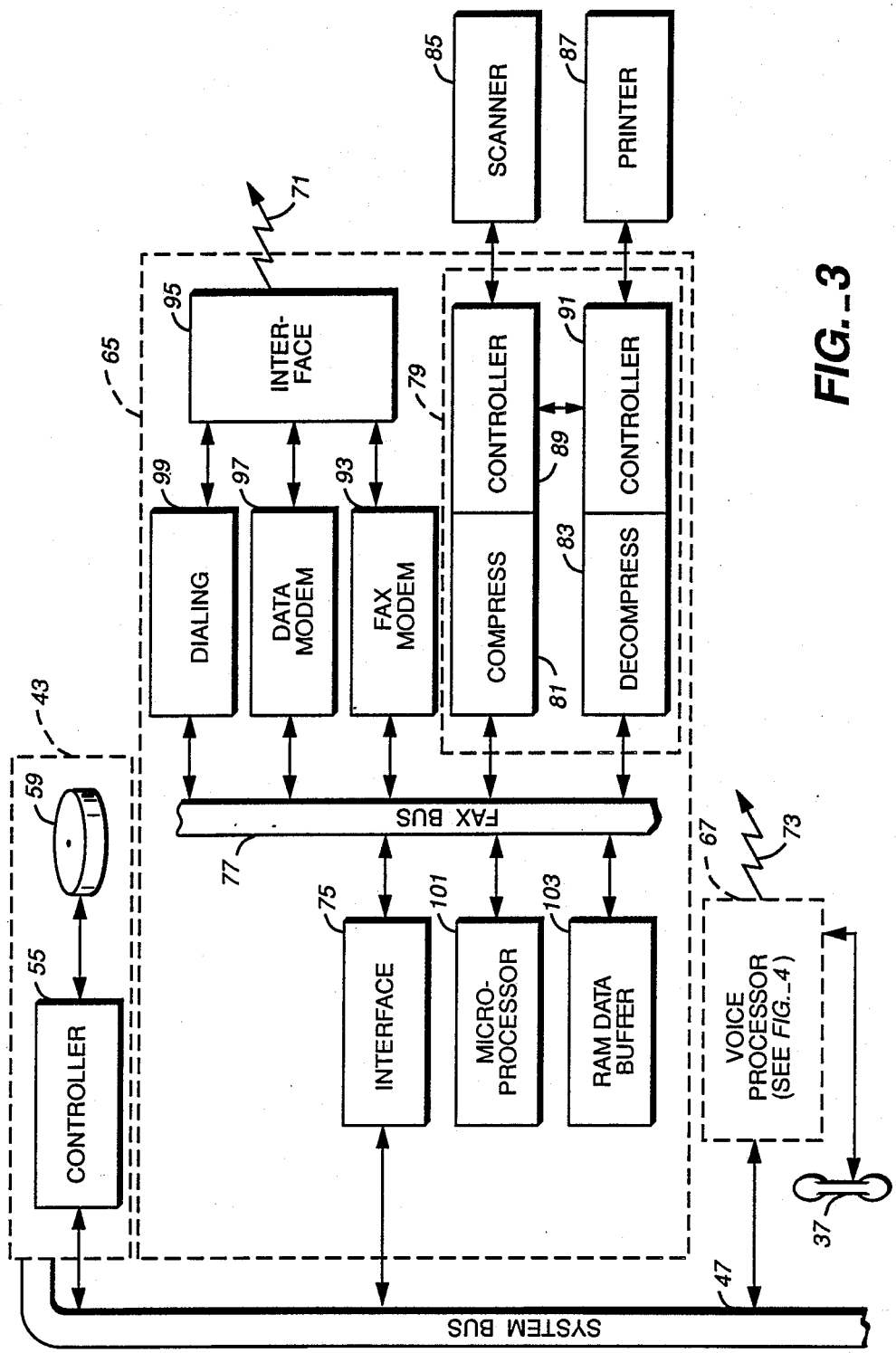
FIG._3

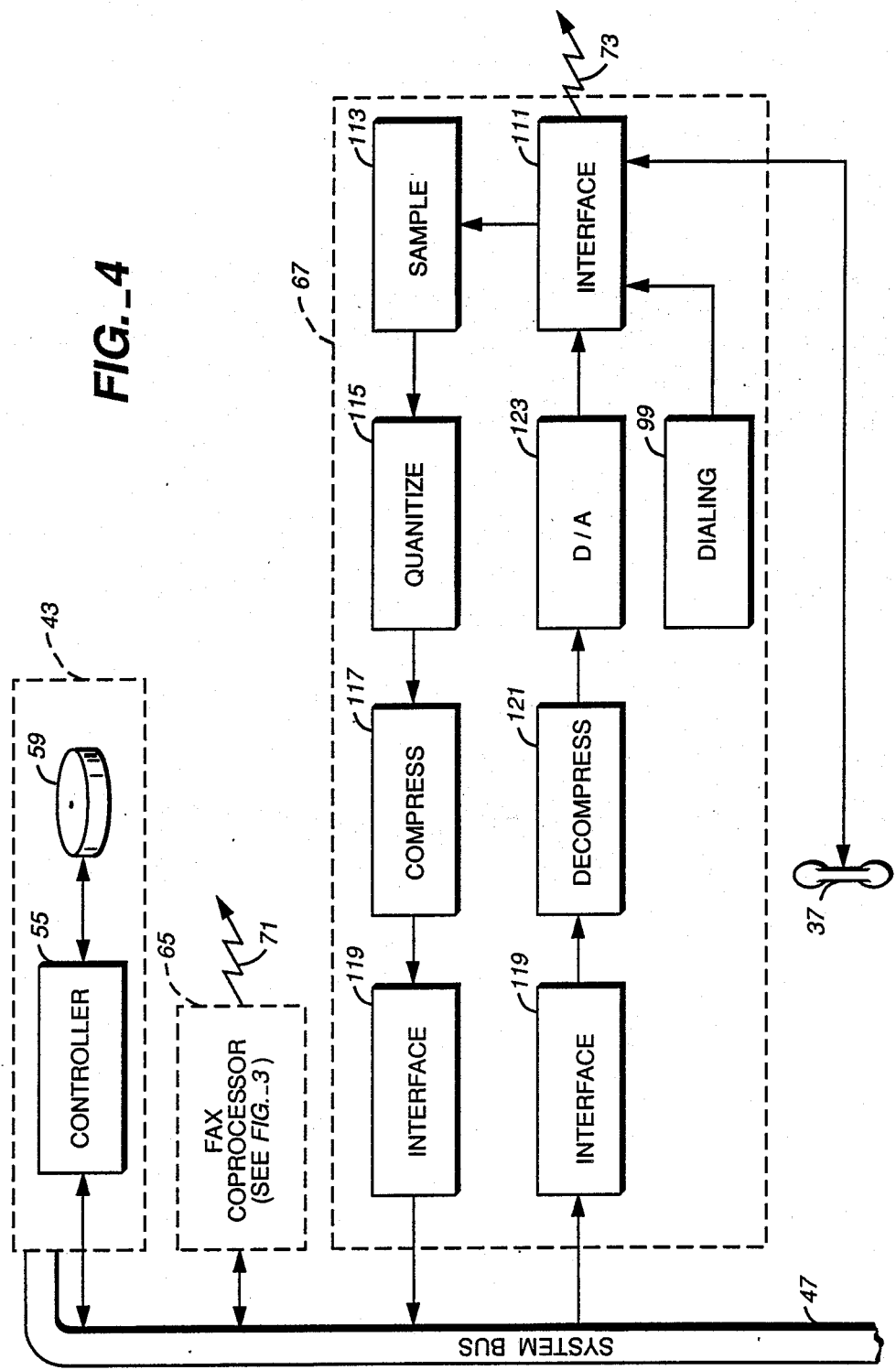

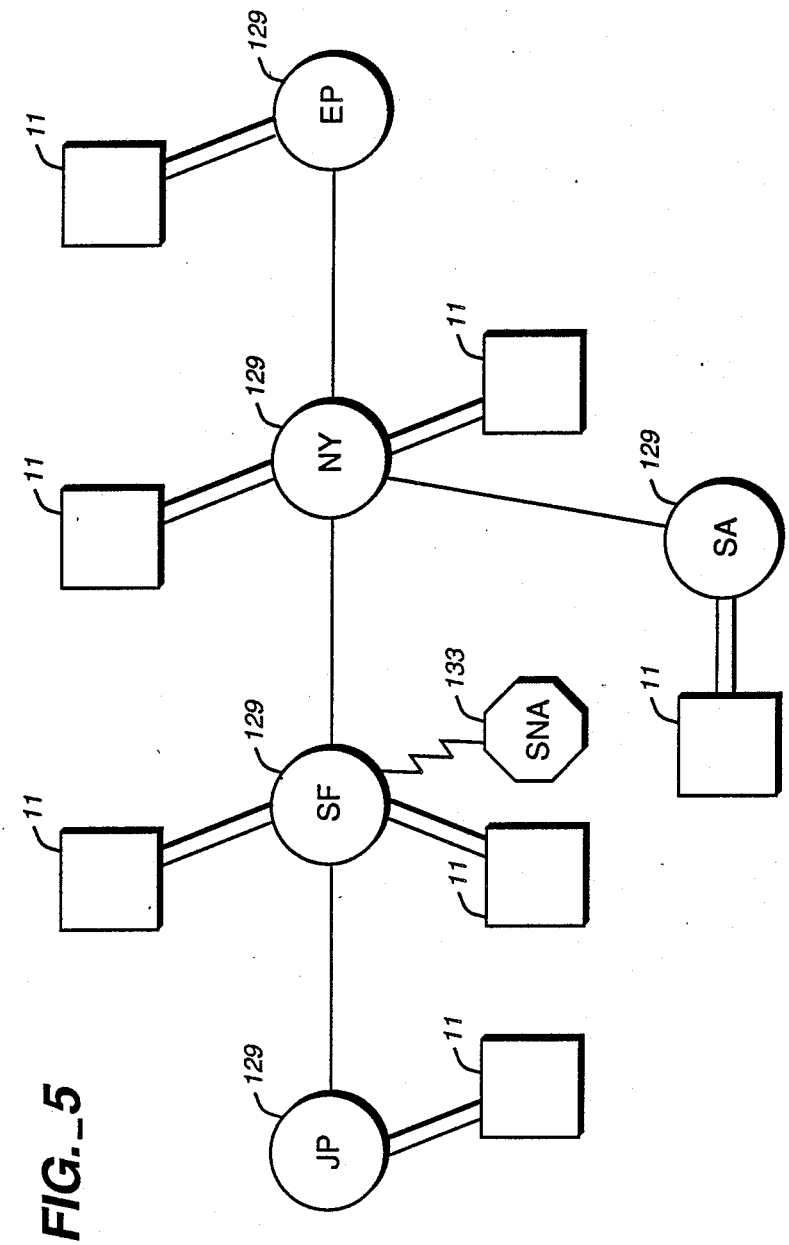
FIG._5

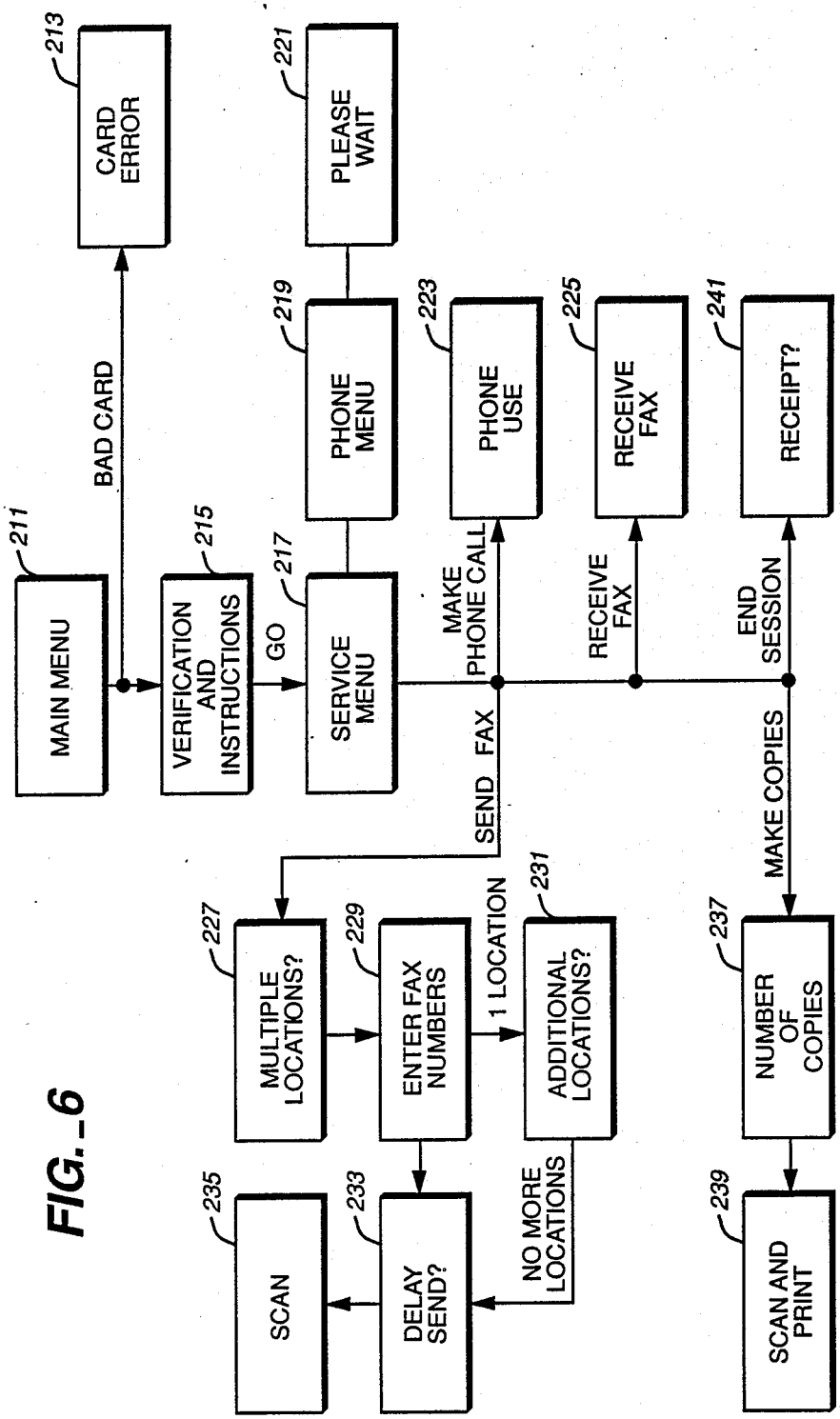
FIG._6

PARALLEL PROCESS COMMUNICATIONS TERMINAL AND NETWORK

DESCRIPTION

1. Technical Field

The invention relates to data communications, and in particular to a credit card access terminal and network for facsimile, voice and data.

2. Background Art

In U.S. Pat. No. Re. 32,115 Lockwood et al. describe a card operated terminal for orders of items such as tickets, reservations and merchandise. A video display and keyboard are used for a user interface, while a credit card reader-writer provides for on the spot payment of products or services. The system may dispense goods on the spot and is linked to a remote central station for delivery of voice information. Information from a remote central computer may be received by a facsimile unit using modems.

In U.S. Pat. No. 3,896,266 Waterbury describes a credit card utilization system involving facsimile machines and modems to verify that the user of a card is an authorized user. In U.S. Pat. No. 3,752,904 Waterbury describes another such system, including a recognition that communications services, such as pay television, may be sold using credit cards at the user location. In U.S. Pat. No. 4,439,636 Newkirk et al. teach that public communications networks involving terminals for voice, facsimile, data and the like may be operated by credit cards.

In summary, the above mentioned patents recognize the desirability of vending communications services from a terminal by credit card and using the computing power of a distant and a local processor.

Computer controlled facsimile circuit boards for IBM XT and AT computers are known. These boards are commercially available and allow software control of a facsimile transceiver, which incorporates a high speed modem. The transceiver may be programmed to send, receive or store messages in accord with a user's commands. While such machines may achieve remarkable flexibility, like a programmable video tape recorder achieves with respect to time shifted viewing of television programming, they are too slow for public terminal use where rapid document processing would be expected, on the same speed level as commonly available facsimile machines.

One of the speed limitations arises because the data compression-decompression algorithm executed with computer circuit boards is done with the same processor which controls the usual computer functions, such as printing, keyboard input, disk storage and modem use. Even the fastest available desk top computer is slow compared to commercially available facsimile machines which have dedicated processors for the specific tasks of modem control and data compression-decompression.

An object of the invention was to devise a specialized public communications credit card access terminal especially suited to real time as well as time delayed document communication, and also capable of data and voice communication.

DISCLOSURE OF THE INVENTION

The above object has been met with a parallel processing credit card terminal, featuring two main processors communicating with a common system bus. Peripheral units, such as a printer, a document scanner and two modems also communicate with the same bus. One processor acts as a system controller, while the other processor is dedicated to high speed implementation of standard facsimile functions. A pair of telephone lines is connected to the terminal for simultaneous voice and data use.

The terminal includes familiar user input and output devices, such as a keyboard and video monitor, but the keyboard is locked and hidden until proper credit card acceptance is signaled from a distant hub. Once the card is accepted, desired service and billing for selected procedures may be initiated. Selection for desired services is made via menus on the monitor. Such services may include document transmission and receipt by facsimile, electronic mail, voice calling, photocopying, computing and terminal emulation relative to distant mainframes.

BRIEF DESCRIPTION OF THE DRAWINGS

FIG. 1 is a perspective view of a communications terminal in accord with the present invention.

FIG. 2 is an electrical block diagram of the terminal illustrated in FIG. 1.

FIG. 3 is a circuit detail of the plan of FIG. 2.

FIG. 4 is another circuit detail of the plan of FIG. 2.

FIG. 5 is a network plan for the terminals of FIG. 1.

FIG. 6 is a block diagram of user interactions with the terminal of FIG. 1.

BEST MODE FOR CARRYING OUT THE INVENTION

With reference to FIG. 1, a stand-alone communications terminal 11 is shown featuring a housing 13 enclosing all of the circuit cards employed by the terminal. A lower portion 15 is used to store supplies, including printer paper. Door 17 permits entry to the lower portion of the housing. A paper supporting bin, not shown, is directly accessible through the door for feeding paper to a facsimile printer. Printed paper emerges through slot 19 after the paper is cut at the end of a page.

An interlocked tilt-up cover 21 is hinged along line 23 so that the cover may swing upwardly and permit placement of a document, face down, on a glass plate so that a scanner, immediately below the plate, may create a document image. Cover 21 is kept locked in place until proper credit authentication is received. Cover 21 is supported from a counter-like surface 22 at desk top height. When cover 21 is down the surface 22 may be used as a work area for writing or organizing.

Credit card authentication is initiated by placement of a credit card in card receiver 25, a portion of a credit card reader. Upon acceptance of a valid card, the scanner cover 21 may be lifted, or a keyboard 27 lowered, by rotation about the hinge line 29. In FIG. 1, the keyboard is in a locked position and so only the underside of the keyboard is shown, with no keys visible. Once the keyboard is unlocked, it may be lowered and made available.

The video monitor 31 displays menus of communications services. Items on the menu may be selected by keys 33. The monitor is usually kept on, with instructions for initiating services. A key pad 35 allows user telephone signaling, using hand set 37 for normal voice communications. Besides dialing, key pad 35 may be used for other dual tone multifrequency signaling over the telephone line associated with hand set 37, whenever prompted either by messages on the screen or by a remote device. Upon completion of services from the terminal, an accounting is given of time and charges and a receipt is ejected from opening 39, indicating time and date, credit card number, services used, as well as the charges for those services.

With reference to FIG. 2, the system electrical plan shows a host CPU 41 with traditional peripheral devices indicated within the dashed line 43. Such devices normally include the video monitor 31 together with an associated video card 45 which may be any of the well-known monochrome or color graphics cards. The video board is connected to a slot in host chassis, electrically communicating with a bus 47. The host CPU 41 is preferably an IBM-AT or compatible computer, IBM PS/2, which features an expandable bus 47 for user attachment of peripheral devices. IBM, AT and PS/2 are trademarks of International Business Machines Corporation. The present invention utilizes such a bus and slots as described below. The host includes random access memory 49, as well as read-only memory 51 as part of the usual system configuration. Although shown to be directly connected to the system bus, these memory units are only indirectly connected via the host 41. Keyboard 27 is shown to be connected to the keyboard controller 53, also communicating with the bus 47 in order to provide inputs to host 41. A disk controller card 55 occupies another slot in the computer chassis for access to the data bus 47. Controller 55 is electrically connected to both a floppy disk 57 and a hard disk 59. The floppy disk is used mainly for diagnostic testing and is completely inside of a housing 13. The disk access port is not accessible to a terminal user, but may be reached only by a service technician having a key to an access door. Hard disk 59 is also located within the housing, but may be accessed by a user for storing a document, either while at the terminal, or in receiving files intended for a user who will be at the terminal at a later time. A needed disk capacity is greater than 30 megabytes and preferably on the order of 40 megabytes. The floppy disk 57, the hard disk 59, as well as the disk controller 55 are all standard items which may be purchased with any AT type of computer. The entire AT-type of computer is enclosed within housing 13, except for the monitor and the keyboard, as previously described.

Also connected to data bus 47 is another peripheral device which is commercially available, but not part of the usual AT type computer. This peripheral is a credit card reader 61 connected to a controller card 63. The card reader and controller are available from Neuron, 24050 Madison Street, Torrance, Calif. 90505. The card reader includes a mechanical transport for receiving a credit card and moving it over a magnetic head which reads data bits encoded on a magnetic strip on the back side of the card. The data bits typically include the type of card (such as Mastercard, Visa, American Express); user name; account number; expiration date. The magnetic head and associated electronics convert the signal to digital form suitable for transmission on bus 47 to the host 41 for accounting purposes.

A facsimile coprocessor module 65 is a circuit board containing communications circuits, as well as a second processor for high speed execution of facsimile functions. The board is connected to bus 47 and receives commands from host 41. In other words, host 41 has overall control of the terminal, but the coprocessor associated with board 65 accomplishes real time fax functions, including compression and decompression of incoming and outgoing images. "Real time" means the time associated with transmission of facsimile images by modern dedicated facsimile machines. By use of dual processors, the system is able to send and receive facsimile messages and at the same time receive instructions for another job, accomplish accounting or operate a voice module 67. Facsimile modules are available from OAZ Communications, Inc., Tustin, Calif. The fax functions are executed in the background, i.e. while the system is doing something else, such as scanning a document, receiving or printing a document, copying a document, performing a voice electronic mail function, etc.

Voice module 67 is a circuit board connected to bus 47 at another slot in the AT computer chassis. The board is connected to telephone handset 37. The chief function of the board is to digitize and reconvert digitized speech if a voice mail function is incorporated in the terminal and to provide a line interface and dialing to the telephone network.

There are two two-way telephone lines associated with the two modules 65 and 67. A first telephone line 71 is associated with coprocessor module 65, while a second telephone line 73 is associated with the voice module 67. The presence of two telephone lines allows voice communication simultaneously with data transfer and interactively with a receiving party. In this manner, a user can comment on an image being received simultaneously via facsimile.

With reference to FIG. 3, facsimile module 65 is shown connected to system bus 47 by means of a bus interface 75, serving to couple an internal bus 77 to the AT bus 47. The internal bus 77 is local for module 65 and allows data communication between module subassemblies. The internal bus communicates with a dedicated fax coprocessor 101. Coprocessor 101 controls the internal bus 77, managing fax functions in a standard way, except for real time compression-decompression. Internal bus 77 is not needed in a PS/2 Microchannel implementation of the invention because the system bus is fast enough to accommodate the data transfer needs of both coprocessors. Fax controller 79 employs an integrated circuit, preferably a Texas Instruments 30134 chip, programmed to execute a standard Group III compression, decompression algorithm at a very fast rate. The compression portion of the algorithm is indicated by block 81 while the decompression portion is indicated by block 83. The compression-decompression algorithms for Group III communications are well known. These include the Modified Huffman and Modified Read algorithms which have been adopted as CCITT Group III facsimile standards. However, the selected chip mentioned above, runs at 40 megahertz, a relatively high speed, allowing real time compression and decompression. On the other hand, the host, being an AT-type computer runs at a speed between 10 and 20 megahertz and would not be able to accomplish the same results in the same time, even if additional tasks were not imposed. The high speed of the chip allows additional functions, requiring minimal processing power to be accomplished by the same processor. These include control of scanner 85 and printer 87. The control functions are indicated by block 89 for the scanner controller and block 91 for the printer controller. Scanner 85 is a Canon document image scanner, or similar scanner, commercially available from Canon, 123 East Paularino Avenue, Cost Mesa, Calif., 92626, serving to capture images at a rate faster than the facsimile document captures speed using a fax modem. The scanner controller 89 feeds the digitized image to data compressor 81 where a file is created suitable for transmission or storage. In the case of transmission, the file is transmitted over internal bus 77 to a facsimile modem 93 operating at the usual Group III rate of 9600 baud. Such modems are commercially available as boards which are connectable to a bus such as the internal bus 77. The modem is connected to a line interface 95 which is able to seize and release the first telephone line 71. Modem 93 responds to commands transmitted on the bus interface 75.

A lower speed data modem 97 is also connected to internal bus 77 and to the line interface unit 95. The data modem, operating at 1200 baud, is intended to receive and transmit data files, such electronic mail or accounting data files as well as remote diagnostics. Such a modem may be a standard Hayes or similar modem, built on a card or chip set and connected to internal bus 77. A dual tone multifrequency (DTMF) encoder and decoder chip 99 is connected to the key pad 35 of FIG. 1 for receiving dialing pulses which are transmitted to the line interface 95 upon seizure of a line for outgoing calls. The DTMF chip or circuit is enabled by a signal received over internal bus 77.

Fax processor 101, having an associated memory 103, is used for overall fax function control and for image buffering. A typical amount of memory is 1 megabyte. Data buffer 103 may also be used to match speed between generation of a compressed or decompressed file and the next operation. Incoming messages are temporarily stored in data buffer 103 until there is an opportunity for another operation, such as storage to the hard disk 59 through the disk controller 55. Alternatively, a previously stored file may be called from the hard disk and placed in the data buffer 103 for transmission over the data modem when the modem becomes available or whenever transmission is called by a remote hub. The processor 101 need not have the processing power of the system CPU and typically is a chip such as an Intel 80186. Memory unit 103, besides acting as a data buffer, may contain programs for bus arbitration and control of internal bus 77, as well as for coordination with data bus 47 via bus interface 75. Voice module 67 is also shown, connected to bus 47 as well as to the second telephone line 73, as explained further below.

With reference to FIG. 4, voice module 67 is seen to be connected to bus 47 and to telephone handset 37. The output of voice module 67 may be to the second telephone line 73 or to hard disk 59. The module includes a line interface unit 111 which converts digital signals to appropriate d.c. voltages for transmission along the second telephone line 73 in the usual way. The interface 111 receives audio from handset 37 and transmits the audio to digitizing circuits including the signal sampling analog-to-digital converter 113, a holding circuit 115 which quantizes the sample signal and a voice compression circuit 117, reducing the bandwidth required for the voice signal. The compressed signal is transmitted to a bus interface 119, controlling access to bus 47. Such control is aided by a fourth microprocessor, such as an Intel 8086, allowing the bus to be shared between the compression circuit 117 and a decompression circuit 121 which receives incoming voice files from the disk 59 for decompression and subsequent restoration by a digital-to-analog converter 123. The DTMF chip 99 which had provided dialing signals for the line interface 95 in FIG. 3, also provides dialing signals for the second telephone line 73. Use of the hard disk 59 allows for voice electronic mailboxes or voice instructions to be stored, as well as a voice bulletin board, in the manner in which electronic mail is processed today.

In summary, the communications terminal of the present invention permits voice communications, in real time or stored in a digital file on the disk, as well as document image communication in real time or stored as an image file on the disk. Additionally, a scanned document may be routed directly to the printer in a copier mode, transmitted over a telephone line or stored on the disk. Use of the credit card module permits billing for any selected communication service. Moreover, by storing telecommunications rates, and capturing area-code-from, area-code-to and duration, it is possible to predict telephone company billing so that a user may be billed for services ahead of receipt from a bill from a telecommunications carrier.

FIG. 5 shows an arrangement of terminals 11 of the present invention, in a network configuration. Each terminal is joined to a hub by a pair of public telephone network subscriber communication lines, indicated by the double lines. Major worldwide hubs 129 link various terminals. The hubs are linked between themselves by means of dedicated, wide-band circuits. Hubs for Japan (JP), San Francisco (SF), New York (NY), Europe (EP), and South America (SA) are shown. Only one hub manages credit card verification and billing, but the other hubs route traffic between terminals. The network functions are: (1) revenue management, (2) message routing, (3) remote diagnostics. Each hub consists of a small telephone central office switching center with commercially available equipment including multiplex equipment. One or more of the hubs may have access to other worldwide communications networks, such as SNA 133, allowing entry into the IBM worldwide network. Similar ports may exist for ARPAnet, X.25 packet switching, X.400 international message system and other communications networks.

Operation of the terminal of FIG. 1 may be understood with reference to FIG. 6, showing a sequence of operations, as seen from the video monitor of the terminal of FIG. 1. A main menu 211 is displayed, instructing a prospective user to insert a credit card into the credit card reader in order to initiate communication services. The card data is read and transmitted to a card verification location and a signal is returned. If there is any problem with the card, either in reading the card or in obtaining a verification, a card error message is displayed, as indicated by block 213. Each of the blocks described below represents a screen of instructions which informs the user of machine operations. If the card is accepted, a verification message is displayed, as indicated by block 215. Instructions are given regarding further procedures and then a menu is presented offering various communication services, as represented by block 217. At this point a user may select a desired service or may pick up the telephone handset. In the event the handset is lifted, telephone menu 219 is activated, offering voice services. Once a service is selected, further instructions are presented together with a wait message, shown in block 221, allowing the terminal to initiate a call or perform another voice function of the type previously described.

If the handset is not lifted, but a telephone option is selected from the menu, a telephone use instruction sequence is presented as indicated in block 223. An alternative procedure is to receive a facsimile message, in which case instructions are set out, as indicated in block 225. On the other hand, if the service choice is to send a fax, an inquiry is made, as represented in block 227, regarding whether multiple locations are involved. There is a prompt for the facsimile telephone numbers for the stations to be contacted, indicated by block 229. If more than one location is involved, there is a prompt for additional locations as set out in block 231. If there are no further locations, there is an inquiry regarding whether the message should be sent at a later time or sent presently, as indicated by block 233. In either case, the document is scanned, as indicated by block 235. If there is a delayed transmission, the scanned file created by the image scanner is sent to disk storage and then later sent out at the delayed interval. Otherwise, the scanned message is transmitted as previously described.

If the choice from the service menu involves making a copy, there is an inquiry regarding the number of copies to be made as indicated in block 237. Once the number of copies is registered, the scan and print function is carried out using the image scanner and printer, as indicated by block 239.

Once communication functions have been completed, a user would indicate an end to the session and would be queried regarding whether a receipt was desired, as indicated by block 241. Once a receipt is issued, or a receipt is refused, the terminal is returned to its initial operating condition, with input devices retracted and locked in place.

A program listing for programs used by the main CPU is contained in the appendices. Appendix A contains files relating to system startup and the user interface. Appendix B contains files for the operation and control of the facsimile and voice modules. Appendix C contains utility files for logging transactions, handling text, credit card operations and billing records. All of the programs were written for the MS-DOS operating environment of an AT type of computer. The program listings have comments which explain the principal operations being performed.

What is claimed is:

1. A public document image and voice communications terminal comprising,
    a data bus having a host CPU connected thereto, the host including a video display and a keyboard for providing a user interface,
    user identification means including a credit card reader-writer for communicating credit card information to said data bus,
    a facsimile module having a coprocessor, an image printer, and an image scanner all communicating with the data bus, said coprocessor having means for compressing and decompressing images in real time, the facsimile module communicating with said bus, a voice transceiver module communicating with the data bus, and
    first and second public telephone communications channels, said first channel communicating with said voice transceiver module and said second channel communicating with said facsimile module, said first and second channels arranged for simultaneous communication.

2. The terminal of claim 1 where said host CPU has accounting means for communicating among said facsimile module, voice transceiver module and said telephone line interface on the one hand and said card reader-writer on the other hand, charging document and voice services to said credit card, said card reader-writer and said voice transceiver module being connected to said host CPU in a manner dependent on said CPU for primary processing requirements, while said facsimile module being connected to said coprocessor for primary processing requirements.

3. The terminal of claim 1 further comprising a housing having means for storing and presenting said keyboard with respect to a user.

4. The terminal of claim 3 wherein said means for storing and presenting said keyboard comprises a closeable and openable cover respectively hiding and displaying said keyboard.

5. The terminal of claim 1 further comprising a housing having means for storing and presenting said image scanner with respect to a user.

6. The terminal of claim 5 wherein said means for storing and presenting said scanner comprises a closeable and openable cover over a transparent plate.

7. The terminal of claim 1 further comprising a facsimile modem and a data modem, said modems being switchable onto said second communications channel.

8. The terminal of claim 7 wherein said modems are connected to a data buffer.

9. The terminal of claim 1 where said host CPU has a disk storage capability exceeding 30 megabytes.

10. The terminal of claim 1 further comprising a housing having a desk height counter top.

11. A communications terminal system comprising,
    a plurality of communications hubs, linked by data channels, forming nodes of a network,
    a plurality of communications terminals linkable to each of said hubs by a communications channel, each terminal as set forth in claim 1.

12. A public document and voice communications terminal comprising,
    (a) a host CPU with peripheral units comprising,
        (i) user interface means with a video display and a keyboard for user interaction with the CPU,
        (ii) user identification means including a credit card reader-writer for communicating credit card information to said CPU,
    (b) a facsimile module communicating with the host CPU, the module comprising a coprocessor, an image printer, and an image scanner, said coprocessor having means for compressing and decompressing images in real time, and a first telephone channel means communicating with the coprocessor for transmitting and receiving images and data,
    (c) a voice transceiver module communicating with the host CPU, said transceiver module having means for digitizing speech and means for converting digitized speech into analog speech, and a second telephone channel means for transmitting and receiving voice signals,
    whereby image and voice signals may be simultaneously transmitted.

13. The terminal of claim 12 where said host CPU has accounting means for communicating among said facsimile module, voice transceiver module and said telephone line interface on the one hand and said card reader-writer on the other hand, charging document and voice services to said credit card, said card reader-writer and said voice transceiver module being connected to said host CPU in a manner dependent on said CPU for primary processing requirements, while said facsimile module being connected to said coprocessor for primary processing requirements.

14. The terminal of claim 12 further comprising a housing having means for storing and presenting said keyboard with respect to a user.

15. The terminal of claim 14 wherein said means for storing and presenting said keyboard comprises a closeable and openable cover respectively hiding and displaying said keyboard.

16. The terminal of claim 12 further comprising a housing having means for storing and presenting said image scanner with respect to a user.

17. The terminal of claim 16 wherein said means for storing and presenting said scanner comprises a closeable and openable cover over a transparent plate.

18. The terminal of claim 12 further comprising a facsimile modem and a data modem, said modems being switchable onto said second communications channel.

19. The terminal of claim 18 wherein said modems are connected to a data buffer.

20. The terminal of claim 12 where said host CPU has a disk storage capability exceeding 30 megabytes.

21. The terminal of claim 12 further comprising a housing having a desk height counter top.

22. A communications terminal system comprising,
- a plurality of communications hubs, linked by data channels, forming nodes of a network,
- a plurality of communications terminals linkable to each of said hubs by a communications channel, each terminal as set forth in claim 12.

* * * * *